UNITED STATES PATENT OFFICE.

JACOB REESE, OF SHARON HILL, PENNSYLVANIA, ASSIGNOR TO THE STEEL PATENTS COMPANY, A CORPORATION OF PENNSYLVANIA.

MANUFACTURE OF STEEL FROM PHOSPHORITIC IRON.

No. 821,744.    Specification of Letters Patent.    Patented May 29, 1906.

Application filed September 23, 1905. Serial No. 279,867.

*To all whom it may concern:*

Be it known that I, JACOB REESE, of Sharon Hill, county of Delaware, and State of Pennsylvania, have invented a new and useful Improvement in the Manufacture of Steel from Phosphoritic Iron; and I do hereby declare the following to be a full, clear, and exact description thereof.

This invention relates to a process of manufacturing iron or steel from phosphoretic iron ore, and has for its object to so treat the metal for the purpose of dephosphorization that the cost of the iron or steel is materially reduced through the production as a by-product of a highly-phosphoretic slag of great commercial value.

To this end my present invention may be, generally stated, as, in effect, a modification of the process set forth in Letters Patent for the manufacture of iron and steel, numbered 401,903, granted to me April 23, 1889, whereby the same is adapted especially to the economic treatment of iron low in phosphorus, said modification, broadly stated, consisting in the substitution for the basic bath of oxid of calcium free from or low in phosphorus of a calcium-phosphate bath whose percentage of phosphoric acid when added to that derived from the molten metal shall augment the phosphoric acid in the resultant slag to at least fifteen and not to exceed twenty-two per cent.

The process embodied in my former patent hereinbefore referred to may be briefly stated as one wherein the phosphoretic iron is first practically desiliconized and decarburized in a Bessemer converter, then transferred to an open hearth wherein in the presence of a bath of the metallic oxids, which may include the oxid of calcium, the fluidity and heat of the metal is maintained by fuel extraneous thereto until all, or substantially all, of the phosphorus and residual impurities, such as silicon, have passed from the metal into the slag. In practice this process has proven very economical in the treatment of iron ores high in phosphorus by reason of the production of a by-product—to wit, a slag high in soluble phosphates and valuable as a fertilizer, but of less value in the case of ores low in phosphorus, as in the latter case the resultant slag is deficient in phosphorus. In order that the resultant slag shall be of practical value as a fertilizer, it should contain at least fifteen per cent. of phosphoric acid and be low in silicates.

In the practice of the basic process for dephosphorization of iron experience has shown that the basic additions will take up as high as twenty-two (22) per cent. of phosphoric acid if the same be present in the molten metal, and it is of this property of the basic bath that I avail myself in the treatment of iron low in phosphorus by my present process, which will now be described. Having first ascertained the per cent. of phosphoric acid present in the metal to be operated upon, I draw the molten metal from the blast-furnace or the cupola, as the case may be, into a Bessemer or similar converter, subjecting the same therein to the usual air-blast until the contained carbon and silicon have been reduced by oxidation to the desired minimum. After the removal of the slag the molten metal from the converter is transferred to a previously-heated basic-lined open-hearth furnace and therein treated to a basic bath of lime and mineral phosphates which are as free from silica as it is possible to obtain and containing such a percentage of phosphoric acid as when added to the phosphorus present in the iron shall produce a slag containing not more than twenty-two (22) per cent. nor less than fifteen (15) per cent. of phosphoric acid. The fluidity of the molten metal in the open hearth is maintained in the usual manner until such time as the molten metal has been freed of its impurities and the phosphates have been taken up by the slag, after which recarburization to the desired extent may be effected by the addition to the molten metal of spiegeleisen or ferromanganese as required by the character of steel to be produced.

Having thus described my invention, what I claim, and desire to secure by Letters Patent, is—

1. The process herein described in the manufacture of steel from phosphoritic iron, which consists in desiliconizing and decarbonizing the metal, in a Bessemer converter, then conveying it into a basic-lined open hearth and therein at a high temperature subjecting it to the action of basic additions containing phosphate of lime, until the phosphorus is removed from the metal and is held in the slag as a phosphate, substantially as and for the purpose set forth.

2. In the manufacture of steel from phosphoritic iron, the method of dephosphorizing the metal by the use of basic additions containing phosphates, which consists in desiliconizing molten iron, then placing it in a basic-lined open hearth, then subjecting it to a high temperature while treated with basic additions containing phosphate of lime, until the metal has been purified, and the slag formed by the basic additions contains at least fifteen per cent. of phosphoric acid.

3. The process herein described for the manufacture of iron and steel and the production of a slag high in phosphoric acid from iron low in phosphorus, consisting in first desiliconizing and decarburizing the molten metal in a Bessemer converter, then transferring the molten metal from the converter to a basic-lined open-hearth furnace and subjecting the molten metal therein to a basic bath having a percentage of phosphoric acid which when added to the phosphorus of the metal shall produce a slag having not less than fifteen (15) per cent. nor more than twenty-two (22) per cent. of phosphoric acid, the temperature and fluidity of the bath being maintained during said additions to the molten metal.

In testimony whereof I affix my signature in presence of two witnesses.

JACOB REESE.

Witnesses:
JAMES McGAHEY,
WM. P. PAINTER.